United States Patent
Marflak et al.

(10) Patent No.: US 6,323,915 B1
(45) Date of Patent: Nov. 27, 2001

(54) METHOD AND APPARATUS TO ENHANCE A BORDER AREA OF A DISPLAY

(75) Inventors: Thomas Adreon Marflak, North Huntingdon; Hirohide Kiga, Greensburg; David Scott Arnold, North Huntingdon, all of PA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/405,722

(22) Filed: Sep. 24, 1999

(51) Int. Cl.[7] .................................................. H04N 3/223
(52) U.S. Cl. ........................... 348/704; 348/377; 348/173; 348/445
(58) Field of Search ..................................... 348/704, 445, 348/173, 377, 556, 615, 581, 913; 315/5.24, 5.29, 368.24, 370

(56) References Cited

U.S. PATENT DOCUMENTS

| | | | |
|---|---|---|---|
| 4,605,952 | 8/1986 | Powers | 358/13 |
| 4,670,784 | 6/1987 | Goldberg | 358/141 |
| 4,760,455 | * 7/1988 | Nagashima | 348/173 |
| 5,130,800 | * 7/1992 | Johnson et al. | 358/183 |
| 5,134,479 | 7/1992 | Ohishi | 358/140 |
| 5,170,256 | * 12/1992 | Jabata | 348/173 |
| 5,291,295 | 3/1994 | Srivastava | 348/805 |
| 5,386,245 | * 1/1995 | Richards et al. | 348/629 |
| 5,461,431 | 10/1995 | Takebuchi et al. | 348/806 |
| 5,519,447 | 5/1996 | Shima et al. | 348/556 |
| 5,521,658 | * 5/1996 | Donohoe | 353/98 |
| 5,734,434 | 3/1998 | Kettenis | 348/445 |
| 5,886,750 | 3/1999 | Osuga et al. . | |

FOREIGN PATENT DOCUMENTS

| | | | |
|---|---|---|---|
| 0 567 301 A2 | 10/1993 | (EP) | H04N/3/30 |
| 0 326 339 A2 | 8/1999 | (EP) | H04N/5/44 |

\* cited by examiner

*Primary Examiner*—Victor R. Kostak
(74) *Attorney, Agent, or Firm*—Mayer Fortkort & Williams, PC; Karin L. Williams, Esq.

(57) ABSTRACT

A method and apparatus for displaying a video signal is described. A first video signal is received representing a first image having a first aspect ratio. The first image is displayed on a display having a second aspect ratio and a display area, with the first image having a smaller area than the display area forming a border area. A second video signal is received representing a second image having the second aspect ratio. A border modification signal is generated. The second image is displayed on the display with the border area modified in accordance with the border modification signal.

15 Claims, 13 Drawing Sheets

METHOD AND APPARATUS TO ENHANCE A BORDER AREA OF A DISPLAY

FIELD OF THE INVENTION

The invention relates to image devices in general. More particularly, the invention relates to a method and apparatus for enhancing a border area of a cathode ray tube (CRT) display used in an image display device such as a television.

BACKGROUND OF THE INVENTION

The presentation of moving images on a display has been a popular medium of communication for many years. As a result, many innovations have evolved to make movies and films capable of reproducing the visual and audible depth, robustness and acuity of the human senses. For example, digital image processing and communication techniques are capable of producing images and movies of exceptional high quality.

As with many industries, the evolution of technologies presents problems, particularly with respect to transitioning from an older technology to a newer technology. For example, in the wireless communications industry, much of the existing infrastructure and cellular telephones were designed to carry analog signals. Due to quality and capacity issues, digital systems and digital cellular telephones were designed. Since development of an entirely new digital system would take a number of years, however, an interim cellular telephone was developed that was capable of communicating using both analog and digital signals (sometimes referred to as "dual-mode" telephones).

The television industry is currently facing a similar problem. In particular, the television industry is presently transitioning from an existing video standard referred to as the National Television Systems Committee (NTSC) standard or the Electronic Industries Association (EIA) standard RS-170A developed in the late 1940s to the High Definition Television (HDTV) standard finalized in the early 1990s. A video signal "standard" specifically prescribes a video signal's synchronization timing, electrical voltage levels, and quality measures.

As a result, many television manufacturers are now developing televisions that are cable of displaying the present NTSC standard signals as well as the new HDTV standard signals. One key difference between these two standards, however, is the aspect ratio. The term "aspect ratio" refers to the dimensions of an image or picture which is calculated by dividing the image's horizontal width by its vertical height. In the present NTSC standard, the aspect ratio is a "4:3" aspect ratio, where 4 is the horizontal dimension and 3 is the vertical dimension. In other words, the horizontal dimension of the image is 1.33 times wider than the vertical dimension. By way of contrast, the HDTV standard calls for a "16:9" aspect ratio. When a 16:9 aspect picture is displayed on a 4:3 aspect ratio television, the horizontal width of the 16:9 aspect picture matches the horizontal width of the 4:3 aspect ratio television, but not the vertical height. Consequently, black bands appear at the top and bottom of the television screen. This is sometimes referred to as a "letterbox" effect, and is shown in FIG. 1.

FIG. 1 is a picture of a 16:9 aspect ratio picture displayed on a 4:3 aspect ratio television display. Displaying a 16:9 aspect picture on a 4:3 aspect ratio television creates a problem referred to as CRT burning. This burning is caused by the phosphors of the CRT being active in the 16:9 portion (shown in white in FIG. 1 and denoted with number 106), but not active in the border area (shown in black in FIG. 1 and denoted with numbers 102). As the phosphors are activated they begin to age and produce less brightness. Thus, the phosphors in the active 16:9 portion begin to age at a rate that is faster than the inactive border area, causing a difference in brightness output that is most noticeable at the transition points (lines between white 106 and black 102 denoted by numbers 104). If the 4:3 aspect ratio television is used to display only 16:9 aspect ratio signals, the burning at the transition points cannot be visually detected. If the television is used to display a 4:3 aspect ratio picture, after sufficient amount of time displaying a 16:9 aspect ratio picture, however, it is possible to visually detect a burn line (lines 104) along the top and bottom edges of the 16:9 aspect ratio picture. This effect is shown in FIG. 2.

FIG. 2 is a picture of CRT burn lines caused by displaying a 16:9 aspect ratio picture on a 4:3 aspect ratio television. As demonstrated in FIG. 2, when a 4:3 aspect ratio picture is once again displayed on the 4:3 aspect ratio television, a pair of noticeable burn lines 202 appear at the top and bottom edges of the previously displayed 16:9 aspect ratio picture. These noticeable horizontal burn lines 202 adversely effect picture quality and distract a viewer.

Another problem associated with displaying a 16:9 aspect ratio picture on a 4:3 aspect ratio display occurs when a 4:3 aspect ratio picture is once again displayed on the 4:3 aspect ratio television. More particularly, the border area created by the 16:9 aspect ratio picture is not active during the display of the 16:9 aspect ratio picture. Because the border area is inactive, the phosphors are not aging at the same rate as the area used for the 16:9 aspect ratio picture. Consequently, when a 4:3 aspect ratio picture is once again displayed on the 4:3 aspect ratio screen, the border area looks brighter than the area used for the 16:9 aspect ratio picture.

At least one previous attempt has been made to solve the CRT burning problem. This attempt, however, is less than satisfactory for a number of reasons. For example, the counter measure attempts to avoid the CRT burning problem by using deflection waveforms to make the 16:9 aspect ratio picture cover the full 4:3 aspect ratio screen. In other words, the 16:9 aspect ratio picture is vertically stretched to cover the black bands at the top and bottom of the 4:3 aspect ratio television display. If the deflection is linear, however, objects in the 16:9 aspect ratio picture appear disproportionately taller than normal. If the deflection is non-linear, shape distortion occurs in the 16:9 aspect ratio picture. Thus, in both instances, the displayed image is noticeably distorted or different from the original image.

In view of the foregoing, it can be appreciated that a substantial need exists for a method and apparatus capable of displaying a 16:9 aspect ratio signal on a 4:3 aspect ratio television that minimizes CRT burning without distorting the 16:9 aspect ratio picture.

SUMMARY OF THE INVENTION

One embodiment of the invention comprises a method and apparatus for displaying a video signal. A first video signal is received representing a first image having a first aspect ratio. The first image is displayed on a display having a second aspect ratio and a display area, with the first image having a smaller area than the display area forming a border area. A second video signal is received representing a second image having the second aspect ratio. A border modification signal is generated. The second image is displayed on the display with the border area modified in accordance with the border modification signal.

With these and other advantages and features of the invention that will become hereinafter apparent, the nature of the invention may be more clearly understood by reference to the following detailed description of the invention, the appended claims and to the several drawings attached herein.

DETAILED DESCRIPTION

The embodiments of the invention include a method and apparatus for displaying a 16:9 aspect ratio signal on a 4:3 aspect ratio television while minimizing CRT burning and without distorting the 16:9 aspect ratio picture. As previously described, CRT burn lines occur at the top and bottom edges of the 16:9 aspect ratio picture being displayed on a 4:3 aspect ratio television. The burn lines are minimized by creating a smoother transition from the no signal area to the signal area. This is accomplished by decreasing the signal strength near the top and bottom portions of the 16:9 aspect ratio signal. Allowing the 16:9 signal strength to "roll off" near the vertical edges can substantially minimize the CRT burn lines while displaying the signal content without distortions.

The embodiments of the invention minimize CRT burn lines by reducing signal strength at the beginning and end of the vertical deflection sweep for a 16:9 aspect ratio signal. Consequently, various points along the video signal path can serve as an implementation point. In one embodiment of the invention, an edge modification signal is applied to the "G1 grid" or "shading grid" of the CRT. In other words, the edge modification signal is applied to the G1 grid of the CRT to adjust the CRT electron gun output.

It is worthy to note that the terms "top edge" and "bottom edge" of the 16:9 aspect ratio picture as used herein refer to the boundary line between the signal area (white area 106) and no signal area (black area 102) at the top and bottom of the 16:9 aspect ratio picture, respectively, or the beginning and end portions of the vertical deflection sweep used to display the 16:9 aspect ratio picture on a screen, respectively.

It is also worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 3:
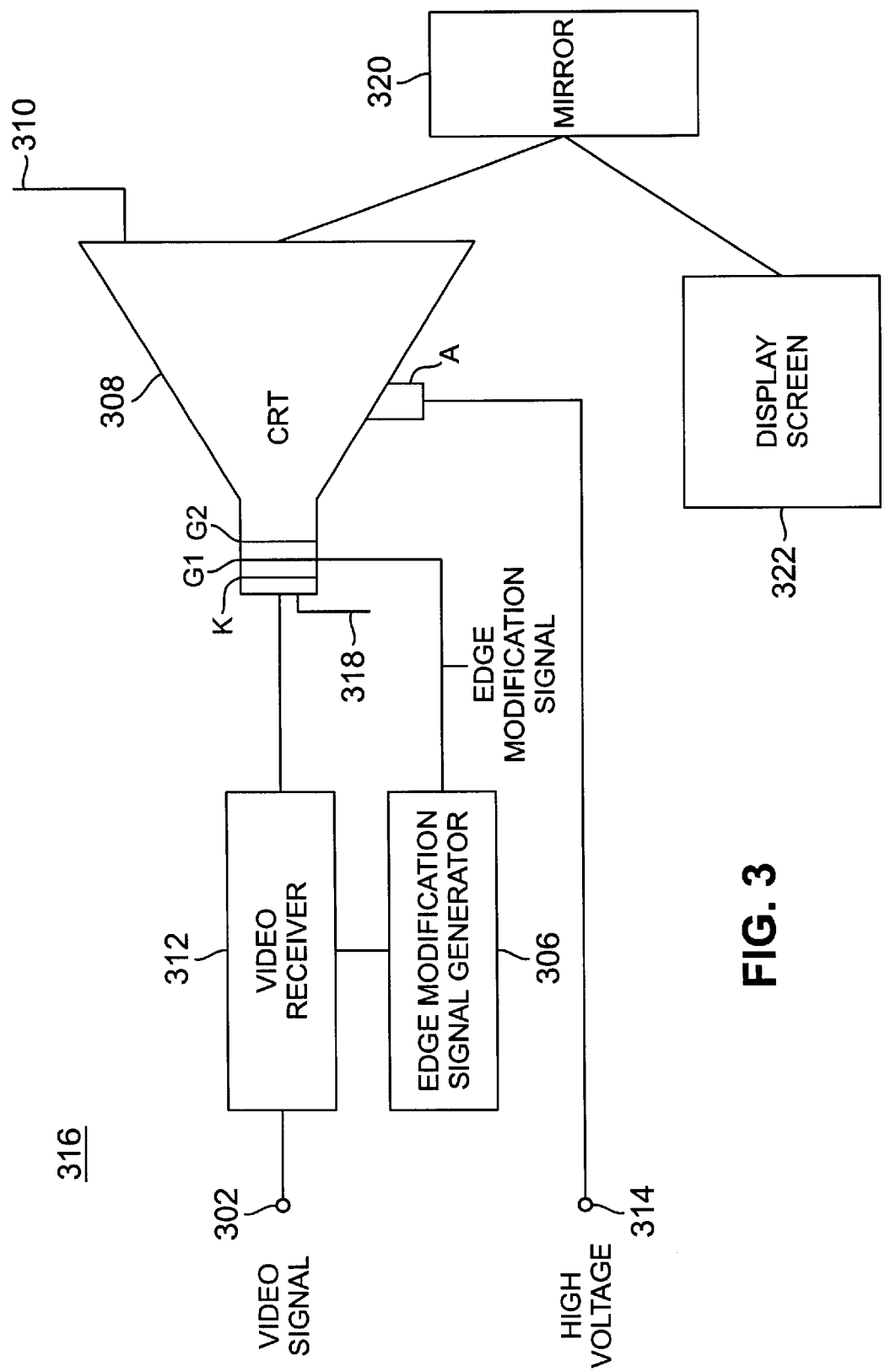
FIG. 3 is a block diagram of portions of a video display system in accordance with one embodiment of the invention.

Referring now in detail to the drawings wherein like parts are designated by like reference numerals throughout, there is illustrated in FIG. 3 portions of a video display system in accordance with one embodiment of the invention. The term "video display system" refers to a system capable of receiving and displaying video signals such as a television receiver equipped with a display system. As shown in FIG. 3, a video display system 316 comprises a video receiver 312, an edge modification signal generator 306, a CRT display system 308, a mirror 320 and a display screen 322.

In this embodiment of the invention, video display system 316 is a large screen projection type television system. In large-sized projection type television receivers, electron beams are projected from three color CRTs (often referred to as red (R), green (G) and blue (B) projection tubes) via a mirror 320 towards a display screen 322 so that images are displayed thereon. Display screen 322 can be either a reflection-type screen or a projection-type screen. In this projection-type television system, the configuration of each R, G and B CRT display system is similar. For purposes of clarity, however, only a single CRT display system 308 is illustrated in FIG. 3 and discussed below, with the understanding that the remaining two CRT display systems will operate in substantially the same manner.

CRT display system 308 comprises an image-receiving tube with an electron gun 318 arranged in a neck portion of a funnel-shaped glass bulb, and an anode (A) and a fluorescent screen 310 are provided in a cone shaped portion of the glass bulb. An electron beam emitted from electron gun 318 is accelerated by an anode voltage of a high voltage from input 314 so as to impinge onto fluorescent screen 310, so that images are displayed thereon.

Electron gun 318 of CRT display system 308 contains a cathode (K) for emitting electrons, and a plurality of cylindrical electrodes, namely grids for converging the electrons emitted from the cathode into an electron beam and also for accelerating the electron beam. These grids are called the first grid (G1), the second grid (G2), and so forth, counting from the cathode side.

The first grid (G1) is often referred to as a "shading grid," since it is used to vary the amount of electrons reaching, for example, fluorescent screen 310. The modulation of the electron beams by image signals is controlled based on the relative potential difference between grid G1 and the cathode. Conventionally, a so-called "cathode-drive type system" is generally employed in which the image signals are supplied to the cathode via video receiver 312 as received from video signal input 302.

Edge modification signal generator 306 is used to minimize burn lines at the top and bottom edges of the 16:9 aspect ratio picture as displayed on a 4:3 aspect ratio CRT such as CRT display system 308. Generator 306 produces an edge modification signal representing a normalized vertical parabolic waveform modified to have a more flat shape at the center to produce the desired signal attenuation. This is discussed in more detail with reference to FIG. 4.

Figure 4:
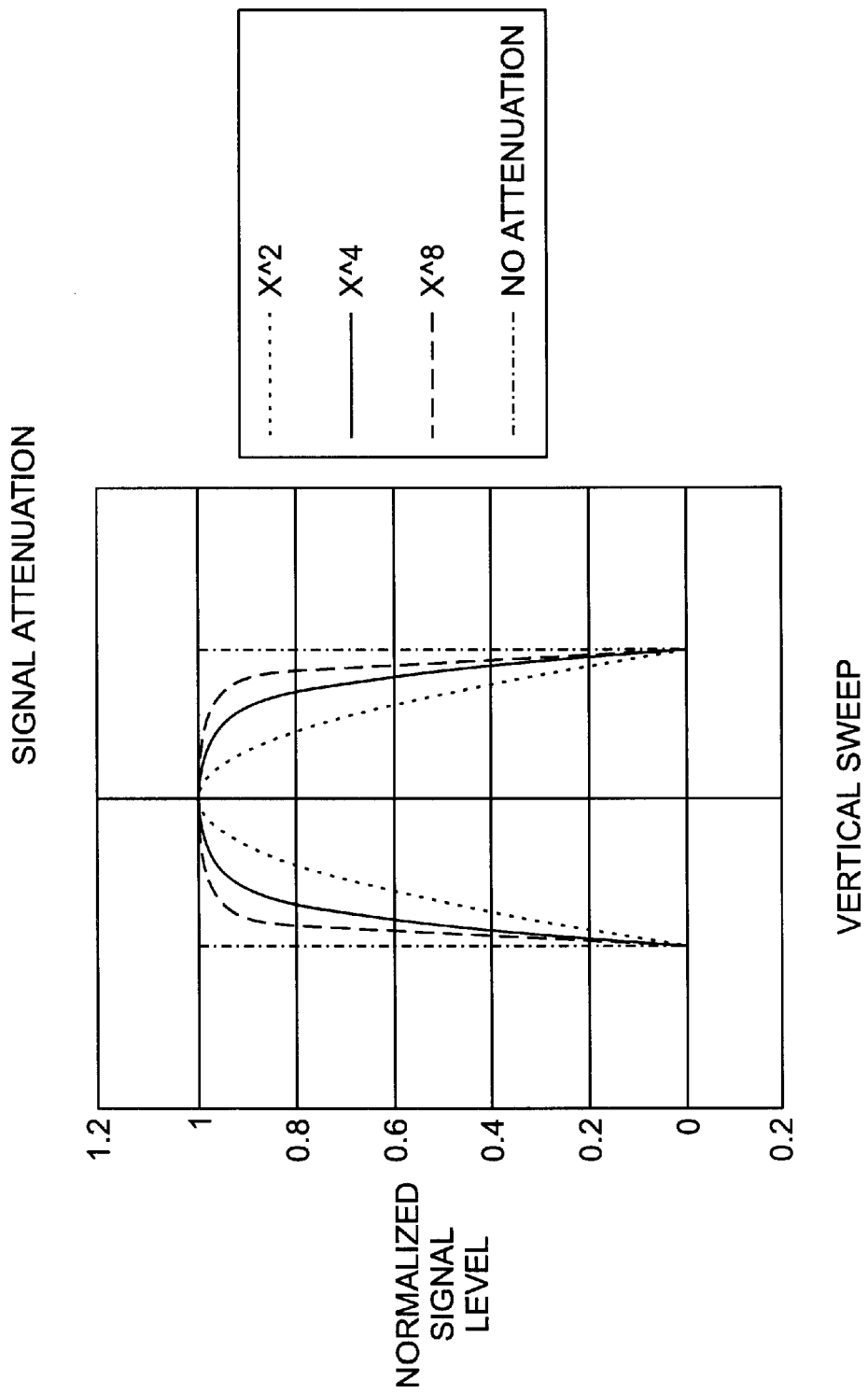
FIG. 4 is a graph of a set of parabolic waveforms used in accordance with one embodiment of the invention.

FIG. 4 is a graph of a set of parabolic waveforms used in accordance with one embodiment of the invention. To produce the desired signal attenuation, generator 306 generates an edge modification signal using a first normalized parabolic waveform ($y=x^2$). The first normalized parabolic waveform, however is not flat enough in the center to produce the desired signal attenuation as shown in FIG. 4. To improve this condition, the $y=x^2$ waveform is multiplied by itself and normalized to produce a second normalized parabolic waveform ($y=x^4$). The second normalized parabolic waveform is multiplied by itself and normalized to produce a third normalized parabolic waveform ($y=x^8$). The third normalized parabolic waveform ($y=x^8$) is scaled, amplified, and then applied to the G1 grid of CRT display system 308. Generator 306 and the edge modification signal will be discussed in more detail with reference to FIG. 5.

Figure 5:
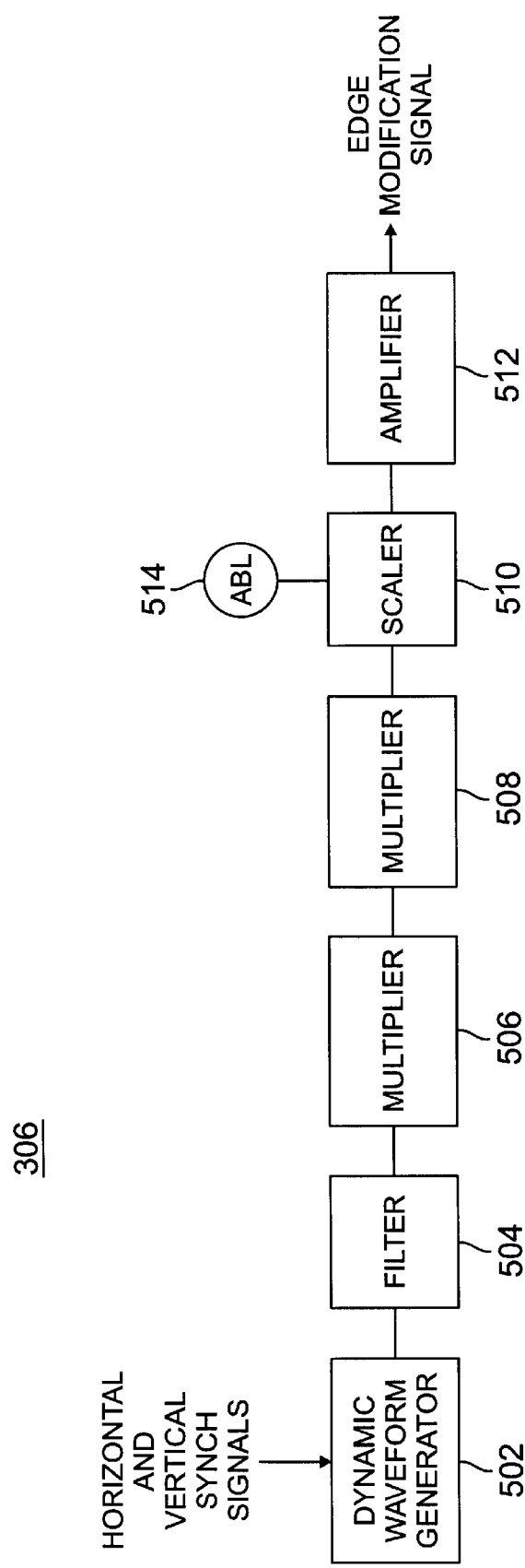
FIG. 5 is a block diagram of an edge modification signal generator in accordance with one embodiment of the invention.

FIG. 5 is a block diagram of an edge modification signal generator in accordance with one embodiment of the invention. As shown in FIG. 5, generator 306 comprises a dynamic waveform generator 502, a filter 504, a pair of multipliers 506 and 508, a scaler 510 and an amplifier 512. In this embodiment of the invention, dynamic waveform generator 502 generates a small signal dynamic focus waveform comprising a horizontal parabola and a vertical parabola.

The small signal dynamic focus waveform is received as input by filter 504. Filter 504 is a low-pass filter. Filter 504 receives the small signal dynamic focus waveform and isolates the vertical parabola or first normalized parabolic waveform as previously described ($y=x^2$) with reference to FIG. 4. Prior to filtering the small signal dynamic focus waveform signal is clamped to +5 volts to ensure positive voltage levels.

The first normalized parabolic waveform ($y=x^2$) is received as input by multiplier 506. The first normalized parabolic waveform, however, is not flat enough in the center to produce the desired signal attenuation as shown in FIG. 4. To improve this condition, multiplier 506 multiplies the first normalized parabolic waveform ($y=x^2$) by itself and normalizes it to produce a second normalized parabolic waveform ($y=x^4$).

The second normalized parabolic waveform ($y=x^4$), however, is still not flat enough in the center to produce the desired signal attenuation as also shown in FIG. 4. Thus, multiplier 508 receives the second normalized parabolic waveform ($y=X^4$) and multiplies it by itself to produce a third normalized parabolic waveform ($y=x^8$). The third normalized parabolic waveform is flat enough in the center to produce the desired signal attenuation, and therefore is appropriate for use as the edge modification signal. Prior to application to the first grid (G1), however, the signal is also scaled and amplified as discussed below.

Scaler 510 receives the third normalized parabolic waveform ($y=x^8$). In this embodiment of the invention, scaler 510 scales the third normalized parabolic waveform ($y=x^8$) by an Automatic Brightness Limiting (ABL) input 514 received from an ABL circuit (not shown). The ABL circuit is a circuit for detecting a current (referred to as an "ABL current") proportional to the brightness of the image-receiving tube, and for feeding back this ABL current to a cathode voltage, thereby limiting the brightness to a preselected value. The output from scaler 510 is received and amplified by amplifier 512, and sent to the first grid (G1) of CRT display system 308. The G1 grid of CRT display system 308 then modifies a quantity of electrons sent from electron gun 318 to fluorescent screen 310 to decrease the quantity of electrons sent to the top and bottom edges of the 4:3 aspect ratio image.

Figure 6:
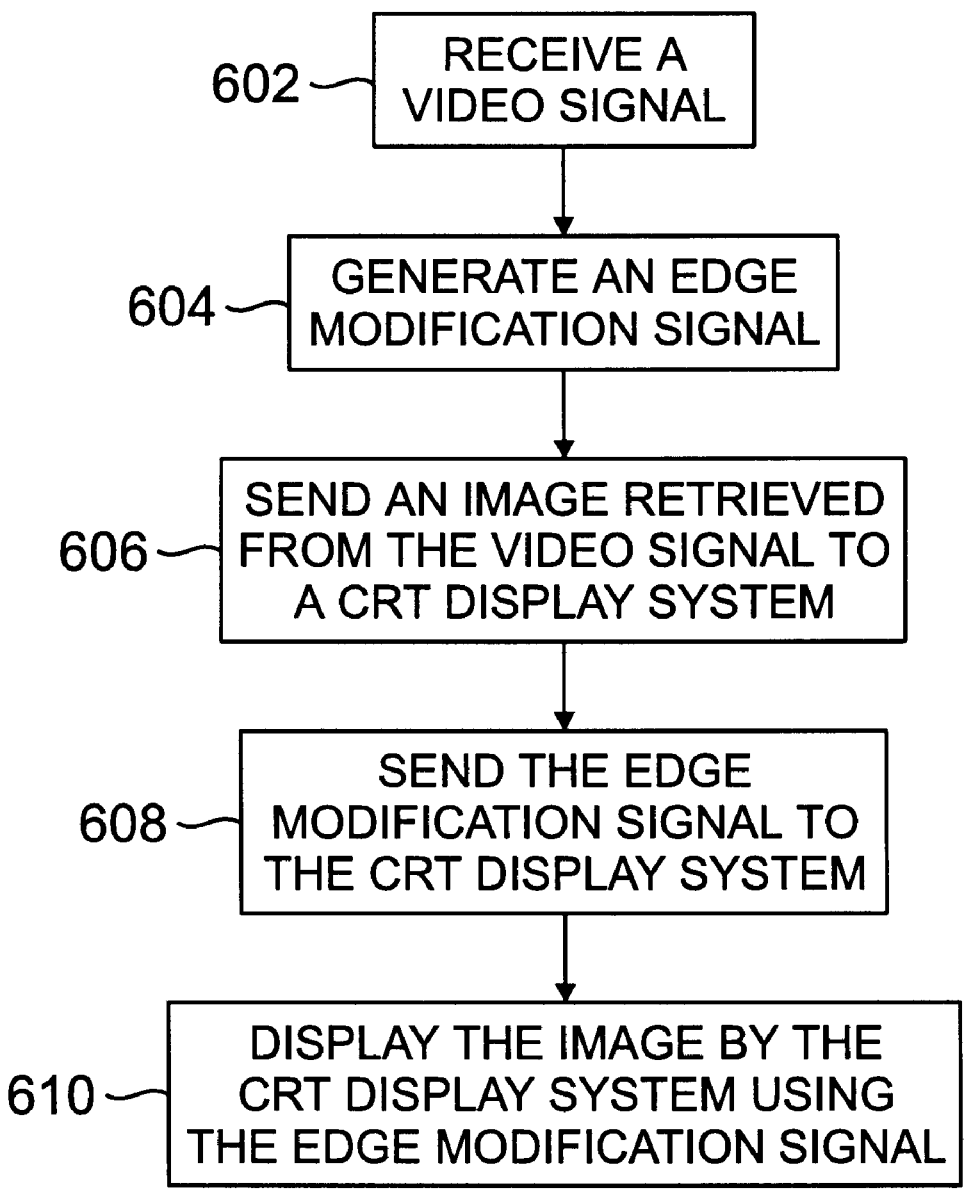
FIG. 6 is a block flow diagram of a method for displaying a video signal in accordance with one embodiment of the invention.

FIG. 6 is a block flow diagram of a method for displaying a video signal in accordance with one embodiment of the invention. As shown in FIG. 6, a video signal representing an image having a first aspect ratio, with the image having a top and bottom edge, is received at step 602. An edge modification signal is generated at step 604. An image is retrieved from the video signal and sent to a CRT display system at step 606. The edge modification signal is sent to the CRT display system at step 608. The image is displayed on a display having a second aspect ratio with the top and bottom edge modified in accordance with the edge modification signal at step 610. It is worthy to note that the timing of steps 606 and 608 does not necessarily have to be sequential and depends on the actual implementation of this embodiment of the invention.

By way of example, the first aspect ratio could be a 16:9 aspect ratio, while the second aspect ratio could be a 4:3 aspect ratio. Furthermore, an example of the CRT display system could be CRT display system 308.

Figure 7:
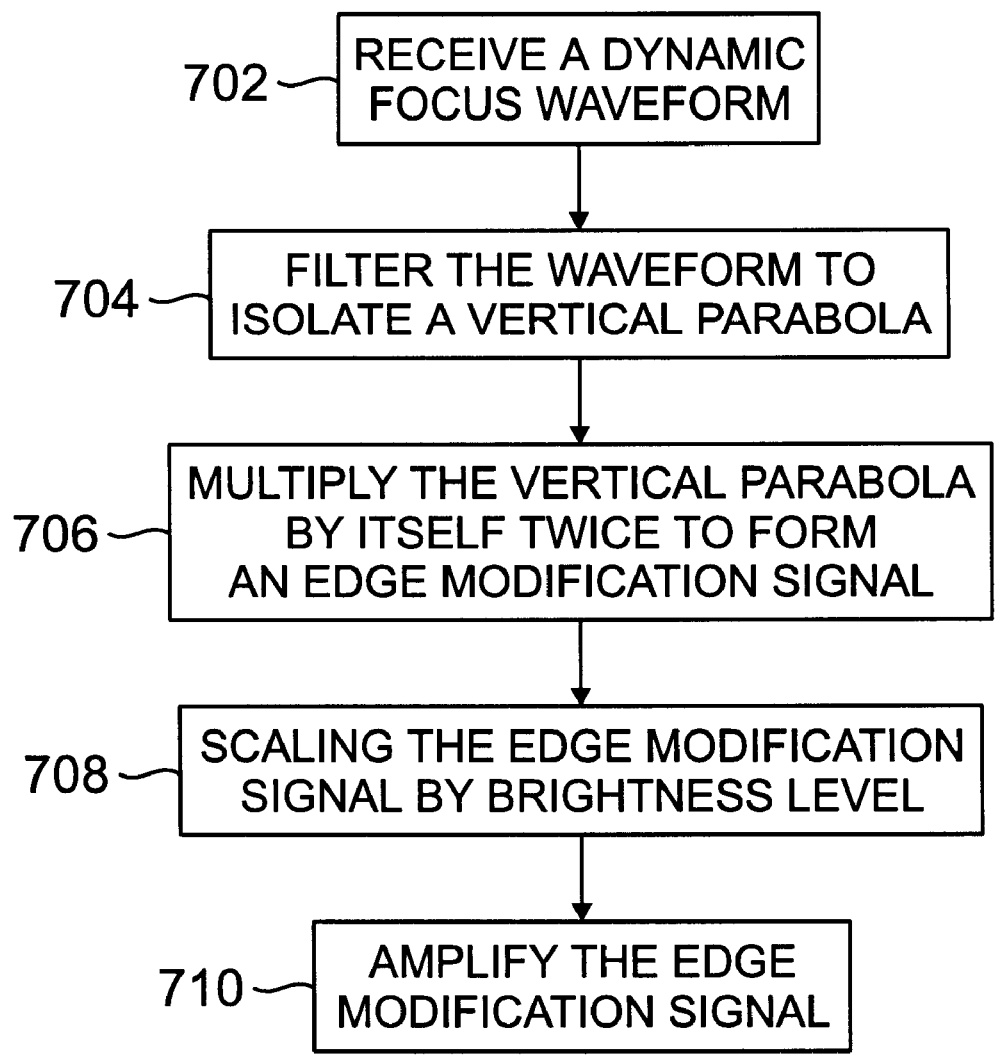
FIG. 7 is a block flow diagram of a method for generating an edge modification signal in accordance with one embodiment of the invention.

FIG. 7 is a block flow diagram of a method for generating an edge modification signal in accordance with one embodiment of the invention. As discussed with reference to FIG. 6, an edge monitoring signal is generated at step 604. More particularly, the edge monitoring signal is generated by receiving a dynamic focus waveform signal comprising a horizontal parabola signal and a vertical parabola signal at step 702. The waveform is filtered to isolate the vertical parabola signal at step 704. The vertical parabola signal is modified by multiplying the vertical parabola signal with itself at least twice to form the edge modification signal at step 706.

To further refine the edge modification signal generated at step 604, the edge modification signal is scaled by brightness level of the image at step 708. The edge modification signal is then amplified at step 710.

Once the edge modification signal is generated, it is sent to a shading grid for the CRT display system, along with the image retrieved from the video signal, as indicated by steps 608 and 606, respectively. The image is then displayed on a fluorescent screen of the CRT display system by sending a stream of electrons representing portions of the image from the electron gun to the fluorescent screen through the shading grid, with the shading grid modifying the stream of electrons using the edge modifying signal to reduce brightness levels at the top and bottom edge of the retrieved image.

Figure 8:
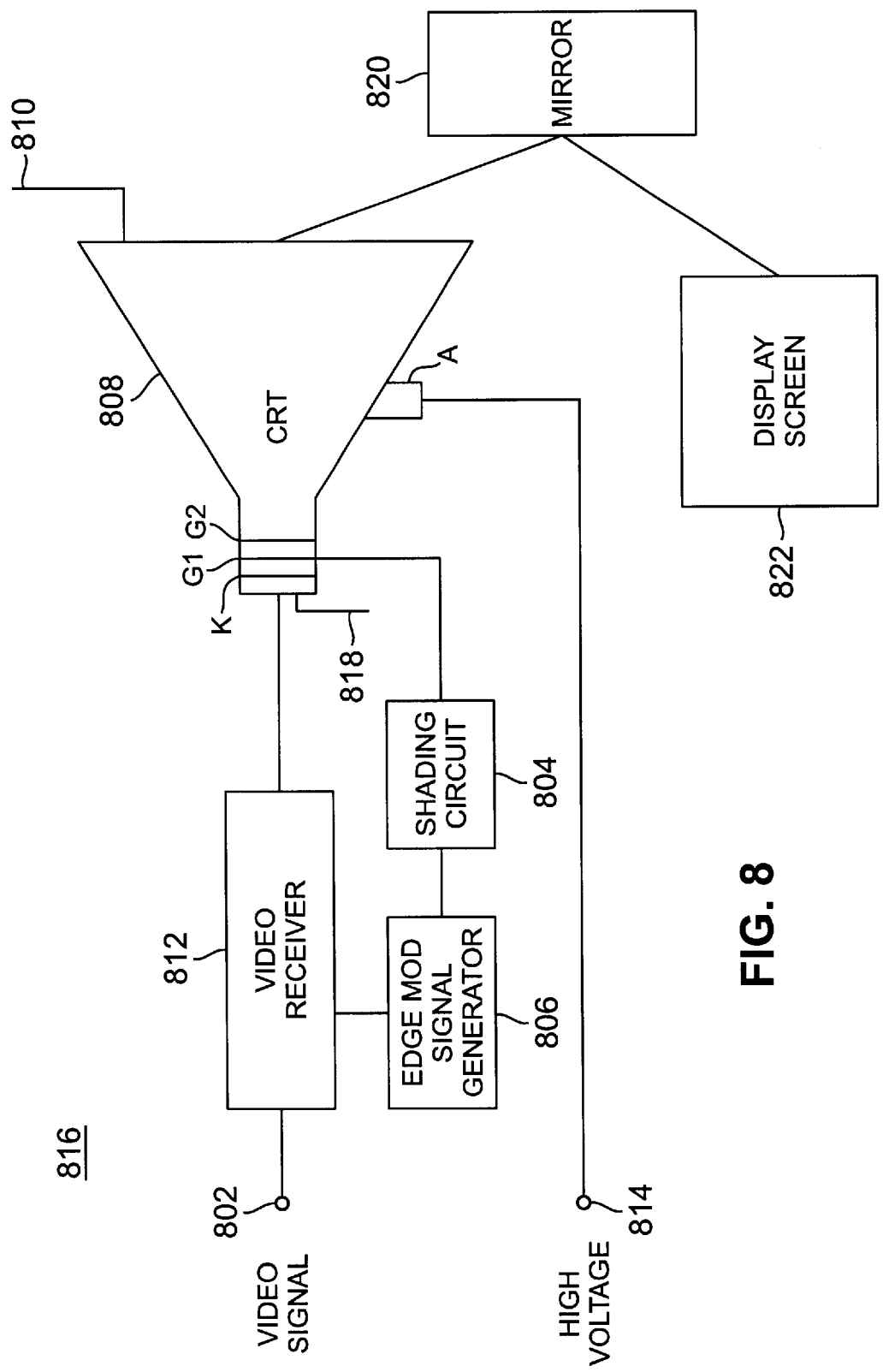
FIG. 8 is a block diagram of portions of a video display system in accordance with another embodiment of the invention.

FIG. 8 is a block diagram of portions of a video display system in accordance with another embodiment of the invention. In this embodiment of the invention, video display system 816 is similar to video display system 316 described with reference to FIG. 3, with the addition of a shading circuit 804. In operation, elements 802, 806, 808, 810, 812, 814, 818, 820, 822, K, A, G1 and G2 operate substantially the same as elements 302, 306, 308, 310, 312, 314, 318, 320, 322, K, A, G1 and G2, respectively, as described with reference to FIG. 3.

Shading circuit 804 is used to compensate for brightness inequalities of fluorescent screen 810 caused by a "shading phenomenon." The shading phenomenon occurs because fluorescent screen 810 is substantially flat. Consequently, the distances over which the electron beams emitted from an electron gun (or a projection tube) having to reach screen 810 differ between the central portion of screen 810 and peripheral portions thereof. As a result, the further the distance from the central portion of screen 810 to the peripheral portions thereof, the more the luminance (brightness) of screen 810 is lowered. In this embodiment of the invention, shading circuit 806 is employed for each of the R, G and B image signals.

In this embodiment of the invention, shading circuit 804 is modified to accept as input the edge modification signal from edge modification signal generator 806. Shading circuit 804 is used to compensate for the shading phenomenon described previously. Part of that compensation includes ensuring that luminance or brightness values are consistent across screen 810 given the varying distances between the electron gun and specific points on the relatively flat surface of screen 810. Within the vertical sweep of the electron gun, shading circuit 804 will invariably also compensate for the shading phenomenon at those transition points that form the top and bottom edge of the 16:9 aspect ratio picture. Shading circuit 804 is therefore modified to receive the edge modification signal and adjust its compensation function accordingly with respect to those transition points.

Figure 9:
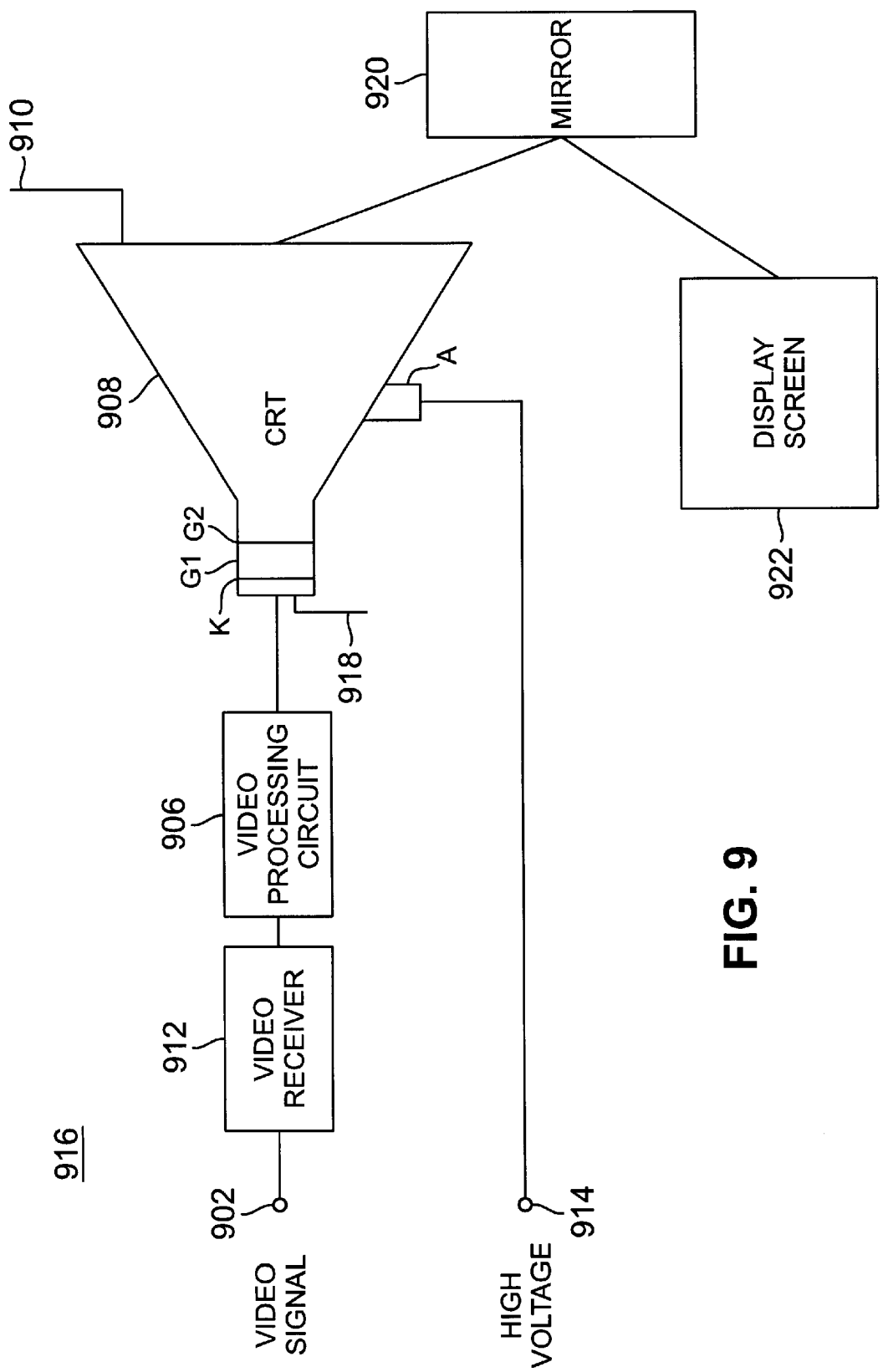
FIG. 9 is a block diagram of portions of a video display system in accordance with yet another embodiment of the invention.

FIG. 9 is a block diagram of portions of a video display system in accordance with another embodiment of the invention. As shown in FIG. 9, a video display system 916 is similar to video display system 316 described with reference to FIG. 3. In operation, elements 902, 908, 910, 912, 914, 918, 920, 922, K, A, G1 and G2 operate substantially the same as elements 302, 308, 310, 312, 314, 318, 320, K, A, G1 and G2, respectively, as described with reference to FIG. 3. In this embodiment of the invention, however, edge modification signal generator 306 is omitted and instead a video processing circuit 906 is connected between video receiver 912 and the cathode (K) of electron gun 918.

Figure 1:
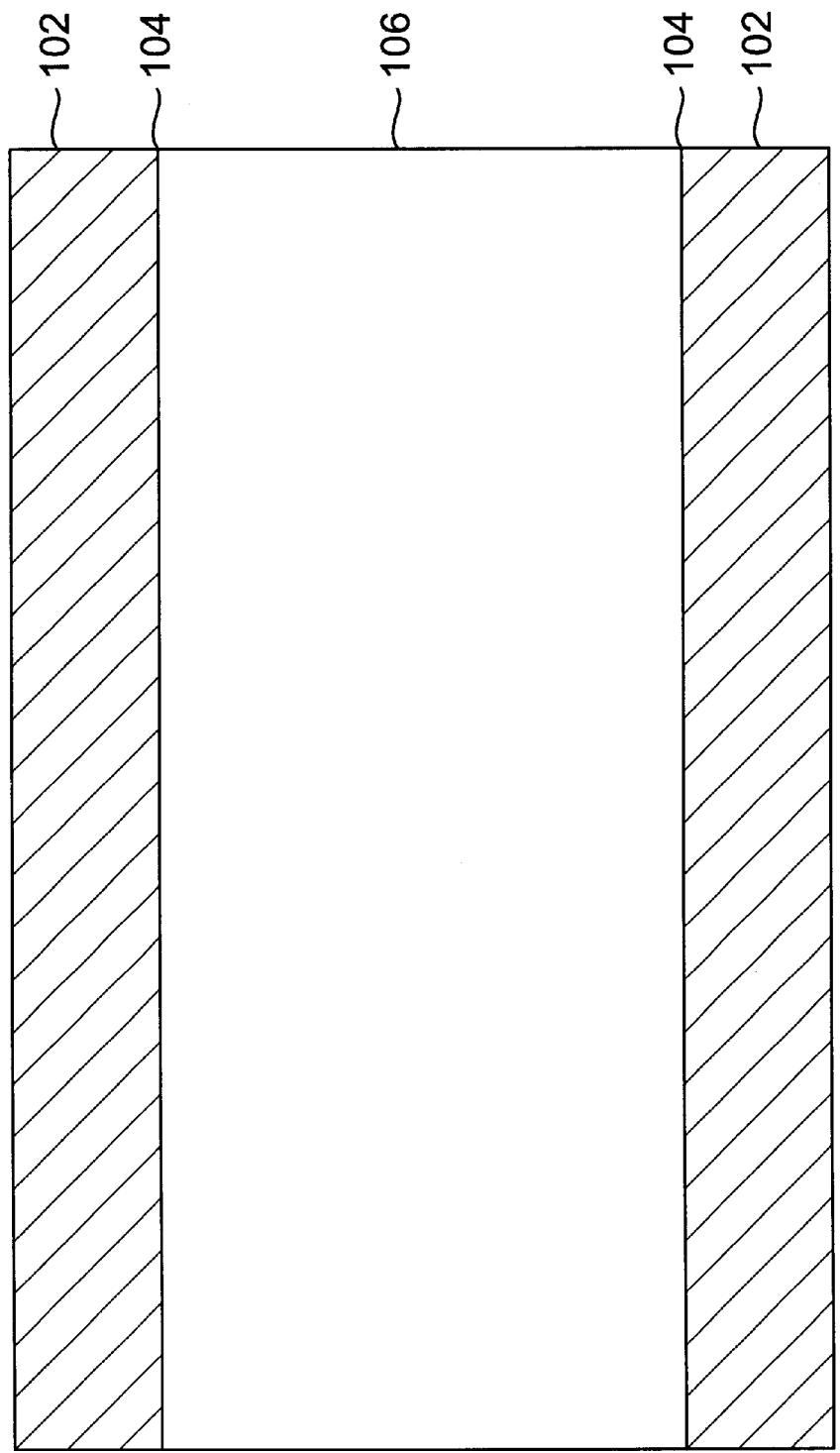
FIG. 1 is a picture of a 16:9 aspect ratio picture displayed on a 4:3 aspect ratio television.
Figure 2:
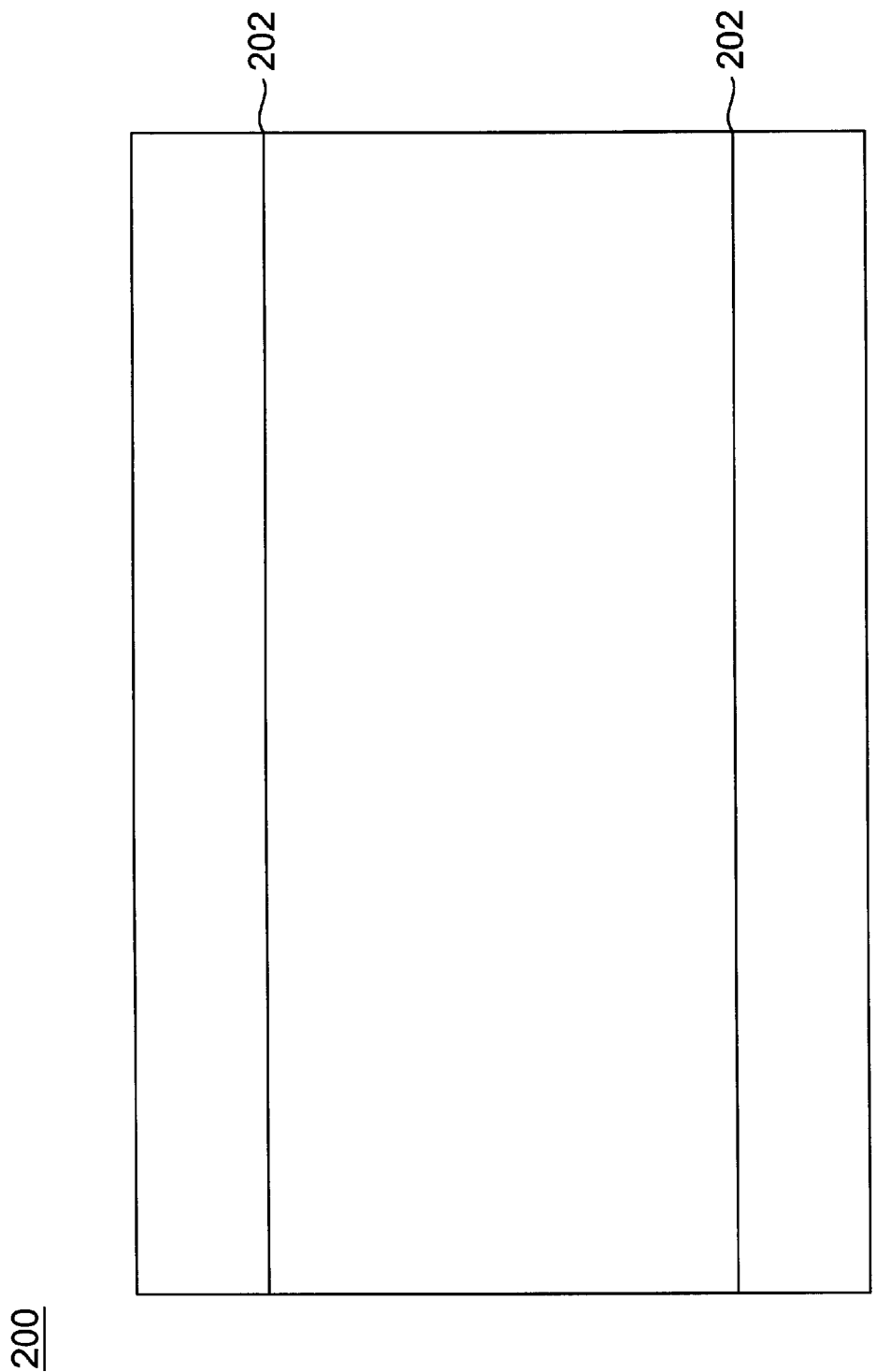
FIG. 2 is a picture of Cathode Ray Tube (CRT) burn lines caused by displaying a 16:9 aspect ratio picture on a 4:3 aspect ratio television.

As discussed with reference to FIG. 3, a cathode-drive type system is generally employed in which the image signals are supplied to the cathode via video receiver 912 as received from video signal input 902. In this embodiment of the invention, the actual video signal as received and decoded by video receiver 912 is sent to video processing circuit 906. Video processing circuit 906 takes the decoded video signal and produces a flat gain response in the center of the vertical sweep cycle with the gain decreasing towards the beginning and end. In this manner, the brightness or luminance values of the 16:9 aspect ratio image that is represented by the video signal is reduced at the top and bottom of the vertical sweep cycle, thereby minimizing CRT burn lines at the transition point between the signal and no signal area (as shown in FIG. 1) of the 4:3 aspect ratio display screen (e.g., fluorescent screen 910). The output of video processing circuit 906 is then sent to the cathode (K) of electron gun 918, displayed on fluorescent screen 910, and finally displayed on display screen 922 via mirror 920.

Figure 10:
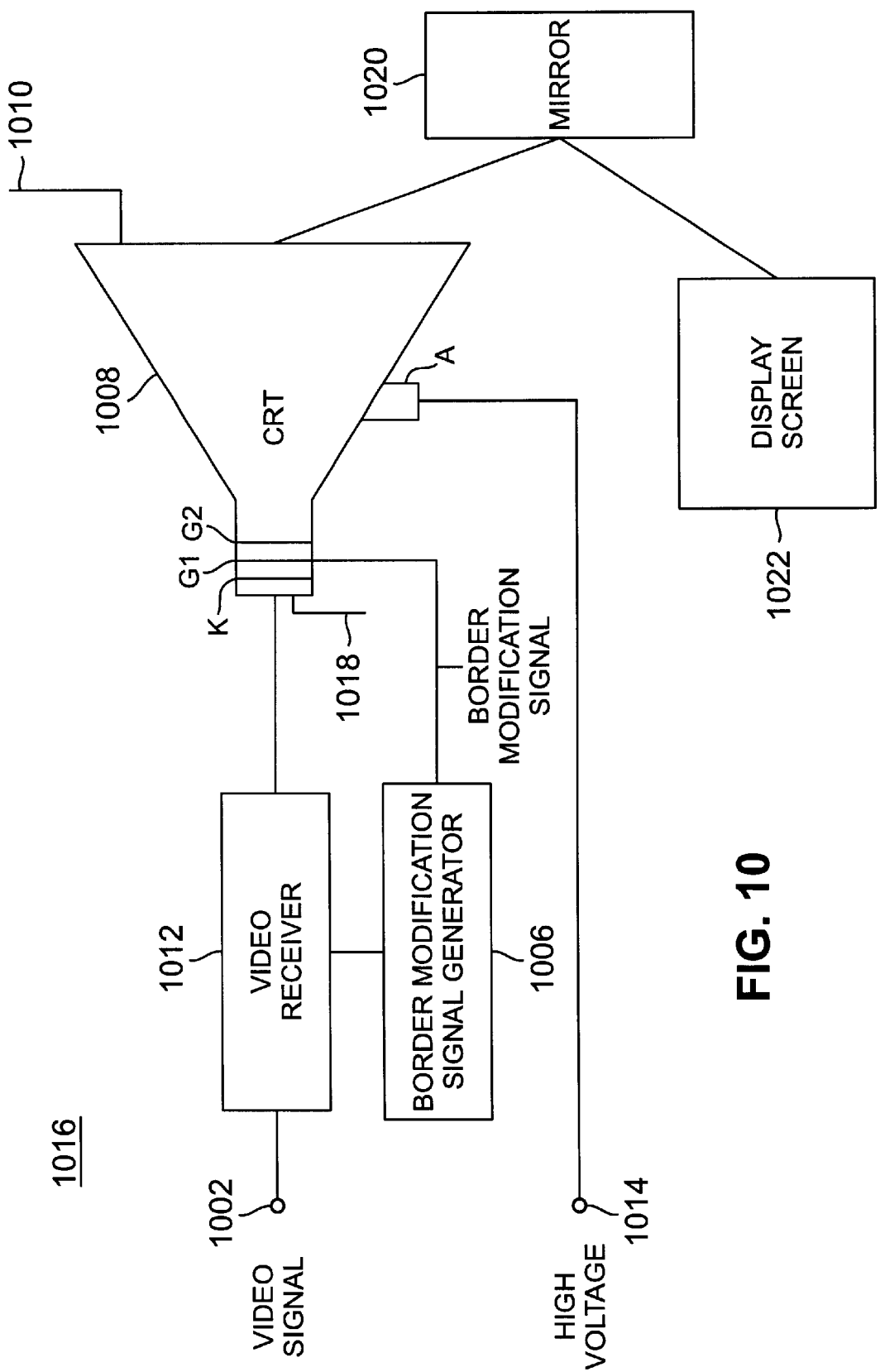
FIG. 10 is a block diagram of portions of a video display system in accordance with a different embodiment of the invention.

FIG. 10 is a block diagram of portions of a video display system in accordance with a different embodiment of the invention. In this embodiment of the invention, video display system 1016 is similar to video display system 316 described with reference to FIG. 3, with the addition of a border modification signal generator 1006. In operation, elements 1002, 1008, 1010, 1012, 1014, 1018, 1020, 1022, K, A, G1 and G2 operate substantially the same as elements 302, 308, 310, 312, 314, 318, 320, 322, K, A, G1 and G2, respectively, as described with reference to FIG. 3.

As discussed with reference to FIG. 1, displaying a 16:9 aspect ratio picture on a 4:3 aspect ratio television creates a problem when a 4:3 aspect ratio picture is once again displayed on the 4:3 aspect ratio television. More particularly, the border area created by the 16:9 aspect ratio picture is not active during the display of the 16:9 aspect ratio picture. Because the border area is inactive, the phosphors are not aging at the same rate as the area used for the 16:9 aspect ratio picture. Consequently, when a 4:3 aspect ratio picture is once again displayed on the 4:3 aspect ratio screen, the border area looks brighter than the area used for the 16:9 aspect ratio picture.

Video display system 1016 is designed to compensate for the higher brightness levels in the border area. This is accomplished by increasing the brightness levels in the border area beyond those levels encoded within the received 4:3 aspect ratio video signal while the 4:3 aspect ratio picture is displayed on the 4:3 aspect ratio display. By artificially increasing the brightness levels of the border area during display of a 4:3 aspect ratio picture, the phosphors within the border area are aged at a rate faster than those phosphors outside the border area. This accelerated aging of the phosphors in the border area compensates for the periods of time when the phosphors in the border area are not in use during the display of the 16:9 aspect ratio picture on the 4:3 aspect ratio display. As used herein, the term "border area" refers to the same area 102 (as shown in FIG. 1) whether the 16:9 aspect ratio picture or the 4:3 aspect ratio picture is displayed on the 4:3 aspect ratio display. In other words, the border area created by displaying a 16:9 aspect ratio picture on a 4:3 aspect ratio display is the area wherein brightness is increased during display of the 4:3 aspect ratio picture on the 4:3 aspect ratio display, even though when the 4:3 aspect ratio picture is actually displayed on the 4:3 aspect ratio display area 102 is no longer black but forms a portion of the 4:3 aspect ratio image itself Thus, this embodiment of the invention comprises a method and apparatus for displaying a video signal. A first video signal is received representing a first image having a first aspect ratio. The first image is displayed on a display having a second aspect ratio and a display area, with the first image having a smaller area than the display area forming a border area. A second video signal is received representing a second image having the second aspect ratio. A border modification signal is generated. The second image is displayed on the display with the border area modified in accordance with the border modification signal.

The border modification signal is generated by border modification signal generator 1006. To produce the desired signal attenuation, generator 1006 generates the border modification signal using a first normalized parabolic waveform ($y=x^2$). The first normalized parabolic waveform, however is not flat enough in the center to produce the desired signal increase (shown in FIG. 4). To improve this condition, the $y=x^2$ waveform is multiplied by itself and normalized to produce a second normalized parabolic waveform ($y=x^4$). The second normalized parabolic waveform is scaled, amplified, and then applied to the G1 grid of CRT display system 1008. Generator 1006 and the border modification signal will be discussed in more detail with reference to FIG. 11.

Figure 11:
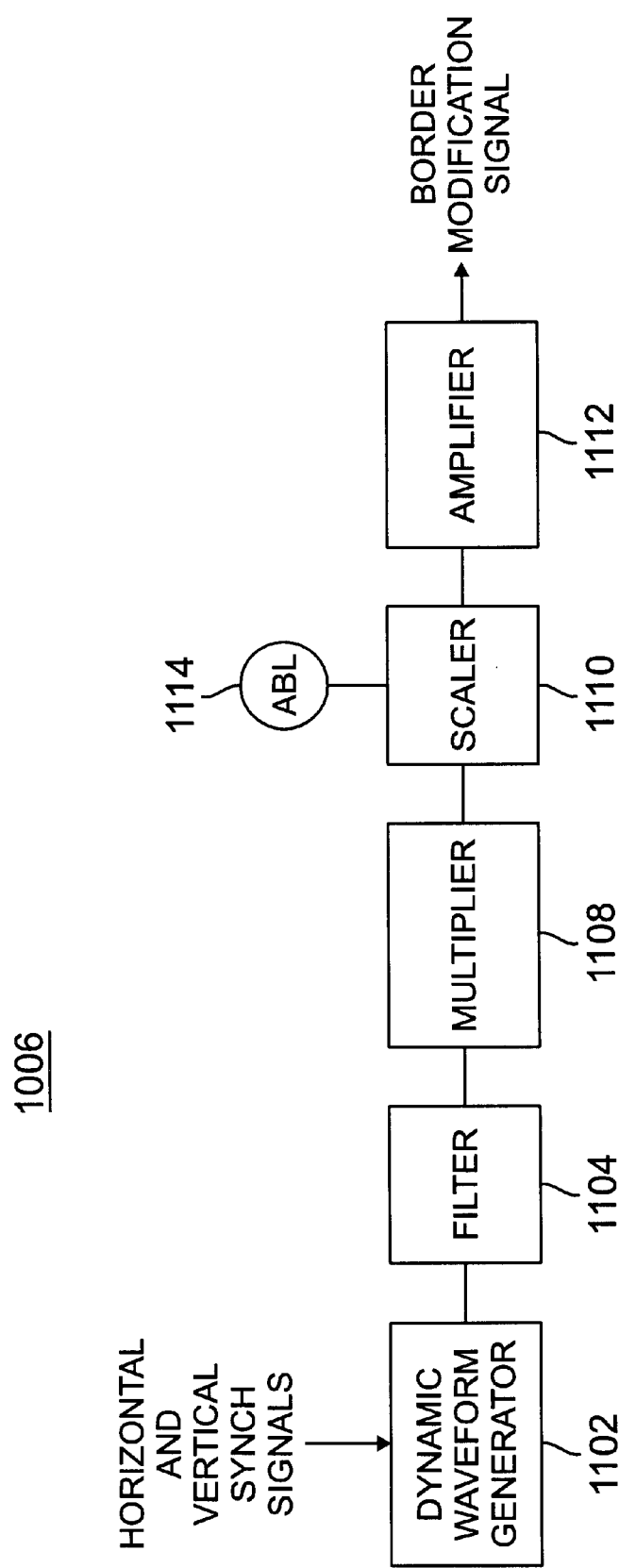
FIG. 11 is a block diagram of a border modification signal generator in accordance with one embodiment of the invention.

FIG. 11 is a block diagram of a border modification signal generator in accordance with one embodiment of the invention. As shown in FIG. 11, generator 1006 comprises a dynamic waveform generator 1102, a filter 1104, a multiplier 1108, a scaler 1110 and an amplifier 1112. In this embodiment of the invention, dynamic waveform generator 1102 generates a small signal dynamic focus waveform comprising a horizontal parabola and a vertical parabola.

The small signal dynamic focus waveform is received as input by filter 1104. Filter 1104 is a low-pass filter. Filter 1104 receives the small signal dynamic focus waveform and isolates the vertical parabola or first normalized parabolic waveform as previously described ($y=x^2$) with reference to FIG. 4. Prior to filtering the small signal dynamic focus waveform signal is clamped to +5 volts to ensure positive voltage levels.

The first normalized parabolic waveform ($y=x^2$) is received as input by multiplier 1106. The first normalized parabolic waveform, however, is not flat enough in the center to produce the desired signal increase as shown in FIG. 4. To improve this condition, multiplier 1108 multiplies the first normalized parabolic waveform ($y=x^2$) by itself and normalizes it to produce a second normalized parabolic waveform ($y=x^4$). The second normalized parabolic waveform is flat enough in the center to produce the desired signal increase, and therefore is appropriate for use as the border modification signal. Prior to application to the first grid (G1), however, the signal is also scaled using scaler 1110 and amplified using amplifier 1112 as discussed previously with reference to FIG. 5 and scaler 510 and amplifier 512, respectively. The G1 grid of CRT display system 1008 then modifies a quantity of electrons sent from electron gun 1018 to fluorescent screen 1010 to increase the quantity of electrons sent to the border area of the 4:3 aspect ratio image.

Figure 12:
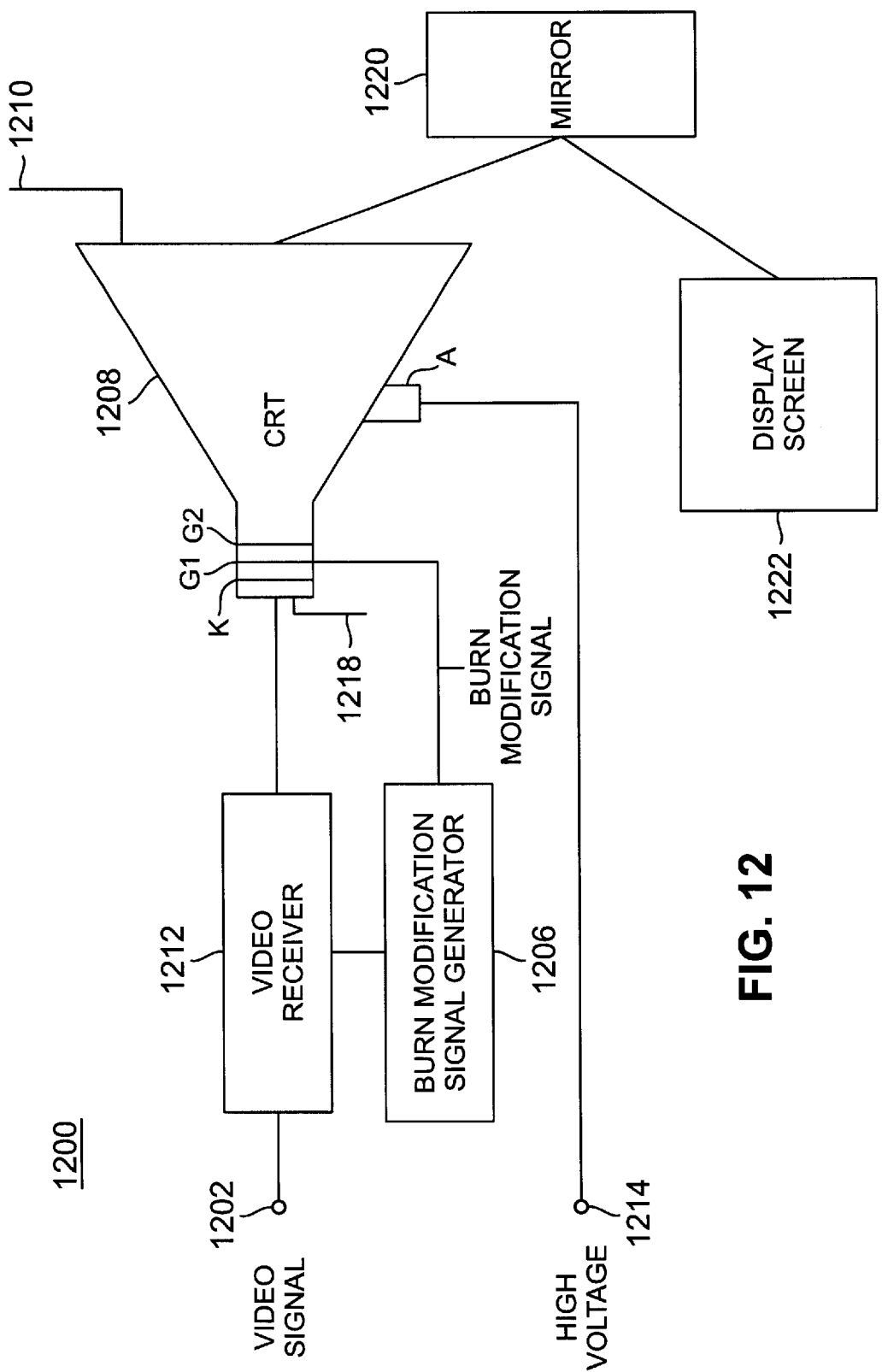
FIG. 12 is a block diagram of a video display system in accordance with yet another different embodiment of the invention.

FIG. 12 is a block diagram of a video display system in accordance with yet another different embodiment of the invention. In this embodiment of the invention, video display system 1200 is similar to video display system 316 described with reference to FIG. 3, with the addition of a burn modification signal generator 1206. In operation, elements 1202, 1208, 1210, 1212, 1214, 1218, 1220, 1222, K, A, G1 and G2 operate substantially the same as elements 302, 308, 310, 312, 314, 318, 320, 322, K, A, G1 and G2, respectively, as described with reference to FIG. 3.

Burn modification signal generator 1206 performs the function of both an edge modification signal generator (e.g., generator 306) and a border modification signal generator (e.g., generator 1006). Video display system 1200 is designed to display images having a 4:3 aspect ratio and a 16:9 aspect ratio using a 4:3 aspect ratio display. Whenever a 16:9 aspect ratio picture is displayed on the 4:3 aspect ratio display, burn modification signal generator 1206 outputs an edge modification signal for use as described with reference to FIGS. 3–9. Whenever a 4:3 aspect ratio picture is displayed on the 4:3 aspect ratio display, burn modification signal generator 1206 outputs a border modification signal for use as described with reference to FIGS. 10–12. The term "burn modification signal" as used herein refers to either an edge modification signal or a border modification signal depending on the aspect ratio of the image being displayed on the 4:3 aspect ratio display. Burn modification signal generator 1206 will be described in more detail with reference to FIG. 13.

Figure 13:
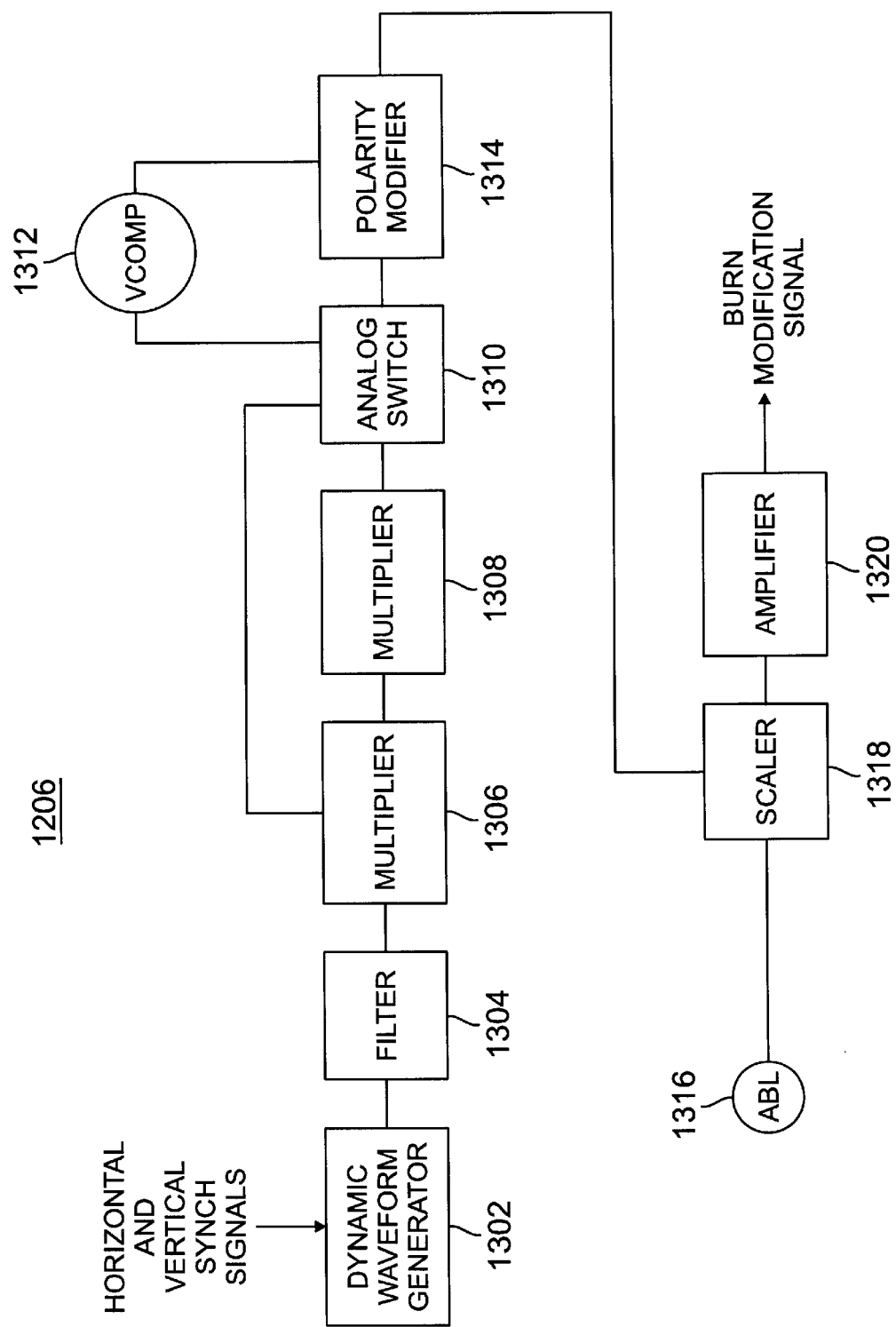
FIG. 13 is a block diagram of a burn modification signal generator in accordance with one embodiment of the invention.

FIG. 13 is a block diagram of a burn modification signal generator in accordance with one embodiment of the invention. As shown in FIG. 13, generator 1206 comprises a dynamic waveform generator 1302, a filter 1304, a pair of multipliers 1306 and 1308, an analog switch 1310, a polarity modifier 1314, a scaler 1318 and an amplifier 1320.

In this embodiment of the invention, dynamic waveform generator 1302 generates a small signal dynamic focus waveform comprising a horizontal parabola and a vertical parabola. The small signal dynamic focus waveform is received as input by filter 1304. Filter 1304 is a low-pass filter. Filter 1304 receives the small signal dynamic focus waveform and isolates the vertical parabola or first normalized parabolic waveform as previously described ($y=x^2$) with reference to FIG. 4. Prior to filtering the small signal dynamic focus waveform signal is clamped to +5 volts to ensure positive voltage levels.

The first normalized parabolic waveform ($y=x^2$) is received as input by multiplier 1306. The first normalized parabolic waveform, however, is not flat enough in the center to produce the desired edge modification signal as shown in FIG. 4. To improve this condition, multiplier 1306 multiplies the first normalized parabolic waveform ($y=x^2$) by itself and normalizes it to produce a second normalized parabolic waveform ($y=x^4$).

The second normalized parabolic waveform ($y=x^4$), however, is still not flat enough in the center to produce the desired edge modification signal as also shown in FIG. 4. Thus, multiplier 1308 receives the second normalized parabolic waveform ($y=x^4$) and multiplies it by itself to produce a third normalized parabolic waveform ($y=x^8$). The third normalized parabolic waveform is flat enough in the center to produce the desired edge modification signal.

Analog switch 1310 receives both the second normalized parabolic waveform ($y=x^4$) and the third normalized parabolic waveform ($y=x^8$) as inputs. Analog switch 1310 also receives a control signal (vcomp) from the video receiver processor 1212 (not shown) from vcomp input 1312. The vcomp signal indicates whether the video signal received at video signal input 1212 represents a 16:9 aspect ratio picture or a 4:3 aspect ratio picture. In this embodiment of the invention, if vcomp is high (e.g., +5 volts) the received video signal represents a 16:9 aspect ratio picture, and if vcomp is low (e.g., 0 volts) the received video signal represents a 4:3 aspect ratio picture. If vcomp is high indicating a 16:9 aspect ratio picture, the third normalized parabolic waveform ($y=x^8$) is passed to polarity modifier 1314. If vcomp is low indicating a 4:3 aspect ratio picture, the second normalized parabolic waveform ($y=x^4$) is passed to polarity modifier 1314.

Polarity modifier 1314 changes the polarity of the incoming parabolic waveform. If the second normalized parabolic waveform ($y=x^4$) is received by polarity modifier 1314, polarity modifier 1314 multiplies the second normalized parabolic waveform ($y=x^4$) by a positive waveform to produce a positive $y=x^4$ signal. If the third normalized parabolic waveform ($y=x^8$) is received by polarity modifier 1314, polarity modifier 1314 multiplies the third normalized parabolic waveform ($y=x^8$) by a negative waveform to produce a negative $y=x^8$ signal. It can be appreciated that the operation of polarity modifier 1314 can be modified in accordance with the type of waveform signals received to achieve the desired polarity of the output waveform. Once the proper polarity of the second or third parabolic waveform is achieved, the resulting signal is scaled by scaler 1318 and amplified by amplifier 1320 (as discussed with reference to FIG. 5 and scaler 510 and amplifier 512) to produce a burn modification signal.

The burn modification signal is passed to the first grid (G1) and used to modify the quantity of electrons passing from electron gun 1218 to screen 1210. As discussed previously, if a 16:9 aspect ratio picture is to be displayed on screen 1210, the burn modification signal is used as an edge modification signal to attenuate the top and bottom edges of the 16:9 aspect ratio picture by decreasing the quantity of electrons sent from electron gun 1218 to screen 1210 at the top and bottom edges of the 16:9 aspect ratio picture. If a 4:3 aspect ratio picture is to be displayed on screen 1210, the burn modification signal is used as a border modification signal to increase the quantity of electrons passing between electron gun 1218 and screen 1210, thereby increasing the brightness level in the border area. The dual outputs of generator 1206 can be received and used to modify the electron stream accordingly in any number of ways by modifying the control circuitry for CRT display system 1008 using standard circuit design techniques.

Although various embodiments are specifically illustrated and described herein, it will be appreciated that modifications and variations of the present invention are covered by the above teachings and within the purview of the appended claims without departing from the spirit and intended scope of the invention. For example, although video display systems 316 and 816 are described above as a large screen projection type television, it can be appreciated that video display system 316 or 816 could be a typical color television having a single CRT display system 308 or CRT display system 808, respectively, and still fall within the scope of the invention. In other words, the video display systems 316 and 816 would not have three CRT display systems 308 and 808, respectively, with each representing R, G and B, but rather have a single CRT display system 308 and 808 with three electron guns (R, G and B) that operate in substantially the same manner as described above with respect to CRT display system 308 and 808. In such an embodiment, it would also not be necessary to have mirrors 320 and 820 or display screens 322 and 822. In another example, although generator 502 is illustrated as part of edge modification signal generator 306, it can be appreciated that generator 502 can appear anywhere in the video signal processing path and still fall within the scope of the invention, as with other embodiments of the invention (e.g., border modification signal generator and burn modification signal generator). For example, generator 502 is often part of the projection engine ("PJ Engine") of a projection television. The PJ Engine performs the function of "registration" or aligning the three beams (R, G and B) of a projection television. The PJ Engine uses generator 502 to help focus corners of an image displayed on the projection television screen. Generator 502 is described herein as part of generator 306, however, to help clarify and facilitate description of the embodiments of the invention. In yet another example, although the embodiments of the invention are demonstrated using a 16:9 aspect ratio signal on a 4:3 aspect ratio display, it can be appreciated that the embodiments of the invention can also be utilized with any first aspect ratio signal being displayed on a second aspect ratio display where the edges of the first aspect ratio signal are not identical to the edges of the second aspect ratio display.

What is claimed is:

1. A method for displaying a video signal, comprising:

receiving a first video signal representing a first image having a first aspect ratio;

displaying said first image on a display having a second aspect ratio and a display area, with said first image having a smaller area than siad display area forming a border area;

receiving a second video signal representing a second image having said second aspect ratio;

generating a border modification signal; and displaying said second image on said border area modified in accordance with said border modification signal, wherein said generating comprises:

receiving a dynamic focus waveform signal comprising a horizontal parabola signal and a vertical parabola signal;

filtering said waveform signal to isolate said vertical parabola signal; and modifying said vertical parabola signal by multiplying said vertical parabola signal with itself to form said border modification signal.

2. The method of claim 1, wherein said first aspect ratio is a 16:9 aspect ratio, and said second aspect ratio is a 4:3 aspect ratio.

3. The method of claim 1, further comprising:

scaling said border modification signal by brightness level of said image; and amplifying said border modification signal.

4. A method for displaying a video signal, comprising:

receiving a first video signal representing a first image having a first aspect ratio;

displaying said first image on a display having a second aspect ratio and a display area, with said first image having a smaller area than said display area forming a border area;

receiving a second video signal representing a second image having said second aspect ratio;

generating a border modification signal; and displaying said second image on said display with said border area modified in accordance with said border modification signal, wherein said displaying said second image comprises:

retrieving said second image from said second video signal; sending said second image to an electron gun for a cathode ray tube display system;

sending said border modification signal to a shading grid for said cathode ray tube display system;

displaying said retrieved image on a fluorescent screen of said cathode ray tube display system by sending a quantity of electrons representing portions of said second image from said electron gun to said fluorescent screen through said shading grid, and with said shading grid modifying said stream of electrons using said border modification signal to increase said quantity of electrons sent to said border area.

5. A method to generate a border modification signal, comprising:

receiving a waveform signal comprising a horizontal parabola signal and a vertical parabola signal;

filtering said waveform signal to isolate said vertical parabola signal; and modifying said vertical parabola signal by multiplying said vertical parabola signal with itself to form said border modification signal.

6. The method of claim 5, further comprising:

scaling said border modification signal by a brightness level; and amplifying said border modification signal.

7. An apparatus to display a video signal, comprising:

a video receiver to receive a video signal representing an image having a previously defined border area;

a border modification signal generator to generate a border modification signal; and a cathode ray tube display system having at least one electron gun, a shading grid and a fluorescent screen, with said electron gun sending a quantity of electrons representing said border area to said fluorescent screen through said shading grid, and with said shading grid increasing said quantity of electrons in accordance with said border modification signal.

8. The apparatus of claim 7, wherein said first aspect ratio is a 16:9 aspect ratio, and said second aspect ratio is a 4:3 aspect ratio.

9. The apparatus of claim 7, wherein said border modification signal generator comprises:
   a dynamic waveform generator to generate a dynamic focus waveform signal comprising a horizontal parabola signal and a vertical parabola signal;
   a filter to filter said waveform signal and isolate said vertical parabola signal; and
   a multiplier to multiply said vertical parabola signal with itself to form said border modification signal.

10. The apparatus of claim 9, further comprising:
    a scaler to scale said border modification signal by a brightness level of said image; and
    an amplifier to amplify said border modification signal.

11. The apparatus of claim 10, wherein said scaler receives automatic brightness limiting control signals proportional to said image to scale said border modification signal.

12. A border modification signal generator, comprising:
    a dynamic waveform generator to generate a dynamic focus waveform signal comprising a horizontal parabola signal and a vertical parabola signal;
    a filter to filter said waveform signal and isolate said vertical parabola signal;
    a first multiplier to multiply said vertical parabola signal with itself to form said border modification signal.

13. The border modification generator of claim 12, further comprising:
    a scaler to scale said border modification signal by a brightness level; and
    an amplifier to amplify said border modification signal.

14. A method for displaying a video signal, comprising:
    receiving a video signal representing an image having an aspect ratio;
    determining whether said aspect ratio is one of a first aspect ratio and a second aspect ratio;
    generating a burn modification signal in accordance with said determination;
    modifying said image in accordance with said burn modification signal; and
    displaying said modified image on a display having said second aspect ratio,
    wherein said generating comprises:
       receiving a dynamic focus waveform signal comprising a horizontal parabola signal and a vertical parabola signal;
       filtering said waveform signal to isolate said vertical parabola signal;
       multiplying said vertical parabola signal with itself to form a border modification signal;
       multiplying said multiplied vertical parabola signal with itself to form an edge modification signal; and
       sending one of said border modification signal and said edge modification signal in accordance with said determination.

15. An apparatus to display a video signal, comprising:
    a video receiver to receive and decode a video signal representing an image having an aspect ratio;
    a burn modification signal generator connected to said video receiver, said generator to receive a control signal indicating whether said aspect ratio is one of a first aspect ratio and a second aspect ratio, and to generate a burn modification signal in accordance with said control signal; and
    a display system connected to said video receiver and said generator, said display system to modify said image in accordance with said burn modification signal, and to display said modified image on a display having said second aspect ratio,
    wherein said burn modification signal generator comprises:
       a dynamic waveform generator to generate a dynamic focus waveform signal comprising a horizontal parabola signal and a vertical parabola signal;
       a filter to receive said dynamic focus waveform signal and filter said waveform signal to isolate said vertical parabola signal;
       a first multiplier to receive said vertical parabola signal and to multiply said vertical parabola signal with itself to form a border modification signal;
       a second multiplier to receive said border modification signal and to multiply said border modification signal with itself to form an edge modification signal;
       an analog switch to receive said border modification signal, said edge modification signal, and said control signal, said analog switch to output said edge modification signal if said aspect ratio is said first aspect ratio, and to output said border modification signal if said aspect ratio is said second aspect ratio.

* * * * *

UNITED STATES PATENT AND TRADEMARK OFFICE
CERTIFICATE OF CORRECTION

PATENT NO. : 6,323,915 B1
DATED : November 27, 2001
INVENTOR(S) : Thomas Adreon Marflak et al.

It is certified that error appears in the above-identified patent and that said Letters Patent is hereby corrected as shown below:

Column 5,
Line 55, change "y=X " to -- y=x --.

Column 8,
Line 36, after "itself", insert a period (--.--).

Column 11,
Line 61, change "siad" to -- said --.
Line 66, after "said" (second occurrence), insert -- display with said --.

Signed and Sealed this

Twenty-fourth Day of September, 2002

Attest:

Attesting Officer

JAMES E. ROGAN
Director of the United States Patent and Trademark Office